Nov. 10, 1964 W. R. EPES 3,156,140
APPARATUS FOR APPLYING TIRE CHAINS
Filed May 23, 1961

INVENTOR
William R. Epes

United States Patent Office 3,156,140
Patented Nov. 10, 1964

3,156,140
APPARATUS FOR APPLYING TIRE CHAINS
William R. Epes, 127 Lefferts Road, Yonkers, N.Y.
Filed May 23, 1961, Ser. No. 112,074
4 Claims. (Cl. 81—15.8)

This invention relates to an apparatus for applying a tire chain to a tire including an improved tool for draping a tire chain having ring or side chains and ground gripping cross chains over the upper tread surface of an automobile tire, while the tire is mounted on the automobile and is supported in a stationary position on the ground.

In accordance with this invention, tire chains of the above type are first draped or placed around the tread surface of a tire and then the ends of the side chains are connected together to secure the tire chain on the tire without jacking the tire off the ground or moving the automobile. Heretofore, because of the interference of the near side of the tire well, it has been difficult to drape or place the chain around the tire without placing the automobile in motion to roll the chain on the tire or without jacking the rear of the automobile up with a bumper jack.

It is advantageous to perform the operation of draping the chain on the tire while the automobile is stationary and the tire remains on the ground, because the time and labor required to roll the tire chain around the tire by placing the automobile in motion, or to jack the rear of the automobile up with a bumper jack is eliminated.

This invention has the further advantage of providing a means for draping chains on a tire quickly and accurately and in a small area, such as a one car garage.

Among the other dvantages of this invention, the end of the inside ring chain may be securely connected together without the person who may be applying the tire chain being required to kneel, lie down, or extend his or her head, or any portion of the body other than the forearm, under the fender of the automobile.

Figure 1:
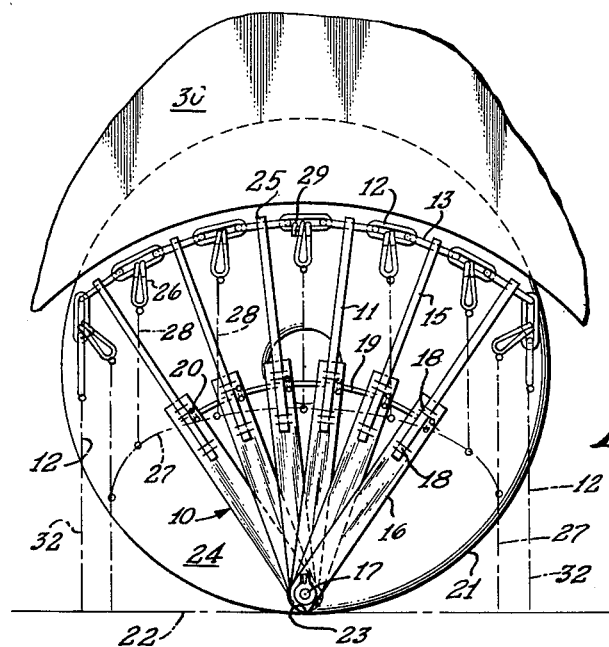
Figure 2:
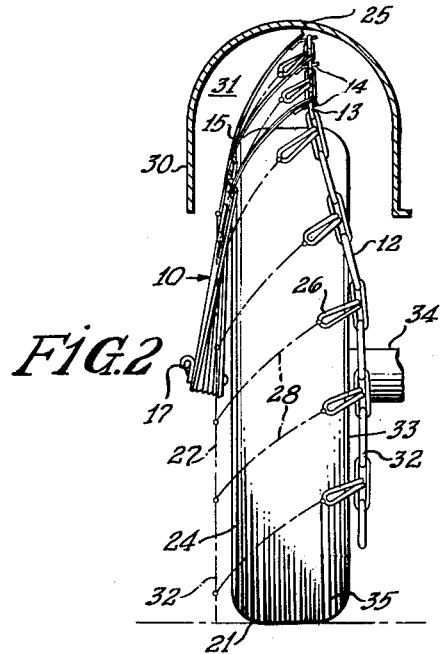

The above and other objects and advantages of this invention will be revealed more clearly by the following description and the accompanying drawings, in which;

FIG. 1 is a view of the tire chain draper supported against the wheel of the automobile to which the tire chain is to be applied and showing the tire chain with parts skeletonized arranged on the draper; and FIG. 2 is an elevational view of the tread of the tire and a central cross section of the tire well as viewed from the right of FIG. 1, and showing the draper and chain thereon elevated into position to drape the chain over the tire.

In applying the tire chain, the operator faces the view shown in FIG. 1 and the view shown in FIG. 2 is taken from the right of the operator. The terms "right" and "left" are used herein in respect to the right and left of the operator. Also in the above and the further description of this invention, the term near side shall mean the side nearest the operator, the term "inside ring chain" shall mean the ring chain which lies against the side wall of the tire farthest away from the operator, and such tire wall shall be referred to as the inside tire wall, and the opposite tire wall shall be referred to as the outside tire wall.

As shown in FIGS. 1 and 2, this invention comprises a fan shaped tire chain draper 10, having a plurality of radiating fingers 11 on the ends of which the inside ring chain 12 of the tire chain is supported. As shown in FIG. 2, the ends of the fingers 11 are bifurcated to form a seat for the links 13 of the inside ring chain. The near sides of links 13 are supported on the lower branch 14 of the bifurcation as applied thereto as shown in FIG. 1.

As shown in FIG. 1, each of the fingers 11 comprise a flexible spring leaf 15 which is attached to a rigid member 16 pivoted on a pin 17. The rigid member 16 may be made of any suitable material, and the spring leaves 15 may be secured thereto in any suitable manner, but as shown in the drawings, the rigid members 16 of the fingers 11 are made of metal and their ends have punched up portions forming clips 18 through which the attached ends of the spring leaves 15 are extended and secured under pressure. The fingers 11 may be folded one over the other as a fan, and when they are spread out as shown in FIGS. 1 and 2, the desired angle between the fingers is controlled by a cord 19, or other suitable flexible member, which is attached at spaced points along its length to the fingers. As shown in FIG. 1, the cord 19 extends along the back side of the rigid members 16 of the fingers 11 and is secured thereto by U-shaped metal clips 20, which extend over the cord 19 and are riveted or otherwise affixed to the rigid members 16.

In the operation of draping the tire chain over the automobile wheel 21, the pivotal end of the draper 10 is placed on the ground, as represented by the dot and dash line 22, opposite the center 23 of the point of contact which the tire 21 makes with the ground, and spaced from the outside wall 24 of the tire. The bifurcated ends 25 of the spring fingers 11 are supported against the outside tire wall 24. The tire chain is then arranged on the draper 10. As shown in FIG. 1, the inside ring chain 12 of the tire chain and the first link 26 of some of the cross chains are shown in full lines, and the remainder of the tire chain, including the outside ring chain 27 and the cross chains 28, are shown in dot and dash lines in order not to obscure the showing of the draper 10. The tire chain is first laid out on the ground so that the side of the cross chains which make contact therewith when placed on the tire, face upwardly. The center portion of the inside ring chain 12 is marked by an indicator such as ring 29. That portion is grasped by the operator and carried upwardly over the draper 10. The ring 29 is located at the center of the arc formed by the ends 25 of the spring fingers 11, and the near side of the links 13 are placed on the lower branch 14 of the bifurcated ends 25 of the fingers. Preferably the spacing between the ends 25 of the fingers 11 as regulated by the cord 19 is equal to the distance between attaching links 26 of the cross chains 28.

When the tire chain is arranged on the draper 10 as above described, some of the cross chains 28, and a portion of the outside ring chain 27 will extend over the fingers 11. The operator now grasps the pivotal end of the draper 10 and carries it and the tire chain directly upward so that the portion of the inside ring chain 12 held by the ends 25 of the fingers 11 is carried upwardly under the tire fender 30 and into the tire well 31 and is suspended above and over the top tread surface of the tire 21. The weight of the tire chain bends the spring leaves 15 of the fingers 11 downwardly, and projects the portion of the inside ring chain 12 into the position shown in FIG. 2, but the ends 32 of the inside ring chain will not initially occupy the position as shown in FIG. 2. On the other hand the ends 32 will initially rest against the outside wall 24 of the tire. The operator now holds the draper 10 with first one hand and then the other, and uses his free hand to place the ends 32 of the inside ring chain 12, in the position shown in FIG. 2, that is, so that the ends 32 extend beyond the inside wall 33 of the tire. The operator then pulls downwardly the ends 32 of the inside ring chain on each side of the wheel axle 34 with his free hand and with sufficient force to further bend the spring leaves 15 of the fingers 11 downwardly until the links 13 slide off the bifurcated ends 25 of the fingers 11. Then the entire ring chain drops downwardly alongside the inside wall 33 of the tire 21, and the tire chain is thereby draped over the top of the tire. In such position the cross chains 28 extend across the tread surface 35 of the tire and the side chains extend along the opposite sides of the tire with their ends resting upon the ground and in place to be connected by a connector not shown herein. A suitable connector and its use for connecting the ends 32 of the inside ring chain 12 is disclosed in my copending application Serial No. 149,452, filed November 1, 1961, now matured into Patent No. 3,114,406. The ends of the outside ring chain may be connected by a conventional connector (not shown) in the usual manner.

Whereas the preferred form of this invention has been shown and described herein, changes may be made therein and it is intended to cover all such changes that come within the scope of the appended claims.

Having thus described my invention, what I claim and desire to protect by Letters Patent is:

1. A tool, for draping a tire chain having inside and outside ring chains and cross chains over a tire comprising spring fingers pivoted at one end on a pivot, said fingers being adapted to be pivoted into a folded position one above the other and adapted to be pivoted into a radiating position about said pivot, means for spacing said fingers at a definite angle in respect to each other, a support on the end of each finger opposite to said pivot for supporting the intermediate portion of said inside ring chain when said fingers are in said radiating position, said fingers being adapted to carry said intermediate portion of said inside ring chain over the top of said tire and to be bent downwardly to release said ring chain from said supports and thereby drape said tire chain over the tire.

2. A tool, for draping a tire chain having inside and outside ring chains and cross chains over a tire comprising spring fingers pivoted at one end on a pivot, said fingers being adapted to be pivoted into a folded position one above the other and adapted to be pivoted into a radiating position about said pivot, a support on the end of each finger opposite to said pivot for supporting the intermediate portion of said inside ring chain when said fingers are extended upwardly in said radiating position, said fingers being adapted to be bent downwardly by the weight of said tire chain to carry said intermediate portion of said inside ring chain over the top of said tire and to be bent downwardly further by a pull on the ends of said ring chain to release said ring chain from said supports, and thereby drape said tire chain over the tire.

3. A tool for draping a tire chain having inside and outside ring chains and cross chains over a tire comprising radiating spring fingers pivotally inter-connected at one end and having their opposite ends bifurcated to provide upper and lower prongs to form a support on said lower prongs for the links of said inside ring chain, and said spring fingers when extended upwardly being sufficiently stiff to support the weight of said tire chain and being sufficiently flexible to be curved downwardly under said weight when said chain is draped over said tool.

4. A tool for draping a tire chain having inside and outside ring chains and cross chains over a tire comprising a plurality of radiating spring fingers, means for connecting one end of each of said fingers together, the opposite ends of said fingers being separated and individually flexible, said opposite end of each of said fingers having a seat for supporting the links of said inside ring chain when the ends of said fingers having the seats thereon are extending upwardly, said spring fingers having sufficient stiffness to support the weight of said tire chain when said fingers are so extended and said chain is draped over said tool, and said fingers being sufficiently flexible under the weight of said chain to be curved downwardly.

References Cited in the file of this patent

UNITED STATES PATENTS

| | | |
|---|---|---|
| 1,103,064 | Lashar | July 14, 1914 |
| 2,082,937 | Bambanek | June 8, 1937 |
| 2,257,657 | Spahr | Sept. 30, 1941 |
| 2,280,316 | Spock | Apr. 21, 1942 |
| 2,462,378 | Fox | Feb. 22, 1949 |
| 2,588,568 | Peterson | Mar. 11, 1952 |
| 2,622,651 | Gause | Dec. 23, 1952 |
| 2,806,392 | Auger | Sept. 17, 1957 |
| 2,806,503 | Hamerski | Sept. 17, 1957 |